(12) United States Patent
Eberlein et al.

(10) Patent No.: US 11,379,217 B1
(45) Date of Patent: Jul. 5, 2022

(54) FEATURE LIFECYCLE MANAGEMENT COCKPIT FOR HYBRID CLOUD AND EDGE SYSTEMS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/313,083

(22) Filed: May 6, 2021

(51) Int. Cl.
*G06F 8/70* (2018.01)
*G06F 8/65* (2018.01)
*H04L 67/10* (2022.01)

(52) U.S. Cl.
CPC .......... *G06F 8/70* (2013.01); *G06F 8/65* (2013.01); *H04L 67/10* (2013.01)

(58) Field of Classification Search
CPC ............ G06F 8/70; G06F 8/65; H04L 67/10
See application file for complete search history.

(56) References Cited

U.S. PATENT DOCUMENTS

| | | | | |
|---|---|---|---|---|
| 9,553,766 | B2 * | 1/2017 | Janke | H04L 67/2823 |
| 9,858,105 | B1 * | 1/2018 | Upadhyay | G06F 9/45558 |
| 10,169,030 | B1 | 1/2019 | Claessens et al. | |
| 10,275,282 | B1 * | 4/2019 | Brandwine | H04L 67/02 |
| 10,402,191 | B1 * | 9/2019 | Eapen | H04L 41/20 |
| 2007/0100513 | A1 * | 5/2007 | Asano | G08G 1/0104 |
| | | | | 701/2 |
| 2014/0020068 | A1 * | 1/2014 | Desai | G06Q 20/3227 |
| | | | | 726/4 |
| 2015/0261518 | A1 * | 9/2015 | Viswanathan | G06F 8/65 |
| | | | | 717/168 |
| 2016/0173331 | A1 * | 6/2016 | Janke | H04L 43/08 |
| | | | | 709/221 |
| 2018/0145895 | A1 * | 5/2018 | Zhou | H04L 67/104 |
| 2018/0165085 | A1 * | 6/2018 | Carter | G06F 8/60 |
| 2018/0293093 | A1 * | 10/2018 | Jain | H04L 67/325 |
| 2018/0309623 | A1 * | 10/2018 | Szobi | H04L 41/0869 |
| 2019/0238403 | A1 * | 8/2019 | Wang | H04L 41/12 |

(Continued)

FOREIGN PATENT DOCUMENTS

WO 2016201340 12/2016

OTHER PUBLICATIONS

Extended European Search Report issued in European Application No. 21202313.9 dated Apr. 4, 2022, 8 pages.

*Primary Examiner* — Lewis A Bullock, Jr.
*Assistant Examiner* — Theodore E Hebert
(74) *Attorney, Agent, or Firm* — Fish & Richardson P.C.

(57) ABSTRACT

Methods, systems, and computer-readable storage media for receiving, by a customer cockpit, a toggle notification indicating that an edge feature of an edge component of a hybrid software deployment is to be activated, the toggle notification being received during execution of a process by the edge component, determining, by the customer cockpit, that the process has ended and, in response, triggering an edge controller to toggle the edge feature to an activated state within the edge component, receiving, by a vendor cockpit, an edge confirmation of the edge component that confirms that the edge feature is in the activated state, and at least partially in response to receiving the edge confirmation, triggering, by the vendor cockpit, a tenant controller to toggle a tenant feature to an activated state within a tenant component of the hybrid software deployment.

20 Claims, 6 Drawing Sheets

(56) References Cited

U.S. PATENT DOCUMENTS

| | | |
|---|---|---|
| 2019/0278589 A1* | 9/2019 | Cook .................... H04L 63/08 |
| 2019/0278691 A1* | 9/2019 | Ramalingam ............ G06F 8/71 |
| 2020/0097279 A1* | 3/2020 | Mukhopadhyay ........ G06F 8/65 |
| 2020/0409685 A1* | 12/2020 | Shimomoto ....... G06Q 20/1235 |
| 2021/0019135 A1* | 1/2021 | Hwang .................... G06F 8/61 |
| 2021/0117859 A1* | 4/2021 | Rogers .................. G06N 3/063 |
| 2021/0149660 A1* | 5/2021 | Abe ......................... G06F 8/65 |
| 2021/0173727 A1* | 6/2021 | Rusev .................... H04L 67/10 |
| 2021/0397428 A1* | 12/2021 | Samuel .............. G06F 11/3438 |
| 2021/0397432 A1* | 12/2021 | Le ............................ G06F 8/65 |
| 2021/0405991 A1* | 12/2021 | Parra, Jr. ................ G06F 9/542 |

\* cited by examiner

FEATURE LIFECYCLE MANAGEMENT COCKPIT FOR HYBRID CLOUD AND EDGE SYSTEMS

BACKGROUND

Software systems can be provisioned by software vendors to enable enterprises to conduct operations. Software systems can include various applications that provide functionality for execution of enterprise operations. In some instances, software vendors provide software systems as off-premise applications that are executed in cloud computing environments, which can be referred to as cloud-based applications (e.g., applications provided in a so-called Software-as-Service (SaaS) deployment). In some instances, software vendors provide software systems as on-premise applications that are executed locally by enterprises (e.g., applications provided in a so-called edge deployment). In some instances, software systems are provided in hybrid deployments that include edge (on-premise) deployment (e.g., satellite components deployed to a data center operated by an enterprise) and cloud deployment (e.g., central components provided as a cloud service by the software vendor).

A hybrid deployment (i.e., edge and cloud) is typically used, if certain components need to be close to the enterprise (e.g., in an enterprise facility close to machines in a factory) to, for example, minimize latency and data volume sent over a network. However, there are still some components executed as a cloud-based service (e.g., components related to processes spanning different on-premise deployments or integrated with other cloud-based processes). In the context of hybrid deployments, an example setup can include a combination of a tenant of a cloud-based (SaaS) product used in production, a tenant of the same cloud-based product used for testing, on-premise (edge) components deployed to several instances on customer premises (e.g., at a data center, at a factory), which are used in production, and, for each type of on-premise component, an instance is deployed on-premise to be used for testing. In this example setup, the production on-premise components are connected to the cloud tenant used for production, and the test on-premise component is connected to the cloud tenant used for testing.

However, hybrid deployments raise numerous technical problems, particularly in the realm of managing lifecycles of features as software evolves over time. For example, as features are added to software, features can be selectively toggled (i.e., switched on/off). An example issue includes a distributed toggle process, in which toggle-handling of features for edge deployments is not done centrally by the software vendor, but instead by enterprises (customers) at their own schedule. Another example technical issue is reflected in the relatively quick availability of new features in the cloud-based components with relatively slower availability of such features in edge components. Another example technical issue is the relatively fast removal of a feature-toggle (e.g., to clean-up the code base) once all customers have switched the toggle (i.e., activated the underlying feature). Another example technical issue is that customers want to enable new features in a controlled manner, including testing, at their own schedule.

SUMMARY

Implementations of the present disclosure are directed to a feature management system to provide consistent control of software feature rollouts and adoption management for software products deployed in hybrid deployments (i.e., cloud-based components and on-premise (edge) components). More particularly, the feature management system of the present disclosure provides a feature management cockpit that includes a vendor view (vendor cockpit) and customer views (customer cockpits) to manage lifecycles of software features in hybrid deployments.

In some implementations, actions include receiving, by a customer cockpit, a toggle notification indicating that an edge feature of an edge component of a hybrid software deployment is to be activated, the toggle notification being received during execution of a process by the edge component, determining, by the customer cockpit, that the process has ended and, in response, triggering an edge controller to toggle the edge feature to an activated state within the edge component, receiving, by a vendor cockpit, an edge confirmation of the edge component that confirms that the edge feature is in the activated state, and at least partially in response to receiving the edge confirmation, triggering, by the vendor cockpit, a tenant controller to toggle a tenant feature to an activated state within a tenant component of the hybrid software deployment. Other implementations of this aspect include corresponding systems, apparatus, and computer programs, configured to perform the actions of the methods, encoded on computer storage devices.

These and other implementations can each optionally include one or more of the following features: actions further include receiving, by the customer cockpit, a tenant confirmation of the tenant component that confirms that the tenant feature is in the activated stat, and at least partially in response to receiving the tenant confirmation, enabling a process to be executed by the edge component at least partially using the edge feature; actions further include removing a feature-toggle corresponding to the edge feature from the edge component after the edge feature is in the activated state, the feature-toggle including computer-executable code that is executed to transition the edge feature to the activated state; actions further include removing a feature-toggle corresponding to the tenant feature from the tenant component after the tenant feature is in the activated state, the feature-toggle including computer-executable code that is executed to transition the tenant feature to the activated state; the edge controller is triggered to toggle the edge feature to the activated state prior to expiration of a deadline; actions further include determining that a problem has occurred after toggling the edge component to the activated state, and, in response, toggling the feature to an inactive state; and actions further include publishing, by the vendor cockpit, data representative of an update to the hybrid software deployment, the data including a component version of the edge component, the edge feature, and a feature deadline for the edge feature, the feature deadline indicating a deadline, by which, the edge feature is to be activated, and receiving, by each of a plurality of customer cockpits including the customer cockpit, the data representative of the update to the hybrid software deployment.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a feature management system to provide consistent control of software feature rollouts and adoption management for software products deployed in hybrid deployments (i.e., cloud-based components and on-premise (edge) components). More particularly, the feature management system of the present disclosure provides a feature management cockpit that includes a vendor view (vendor cockpit) and customer views (customer cockpits) to manage lifecycles of software features in hybrid deployments. Implementations can include actions of receiving, by a customer cockpit, a toggle notification indicating that an edge feature of an edge component of a hybrid software deployment is to be activated, the toggle notification being received during execution of a process by the edge component, determining, by the customer cockpit, that the process has ended and, in response, triggering an edge controller to toggle the edge feature to an activated state within the edge component, receiving, by a vendor cockpit, an edge confirmation of the edge component that confirms that the edge feature is in the activated state, and at least partially in response to receiving the edge confirmation, triggering, by the vendor cockpit, a tenant controller to toggle a tenant feature to an activated state within a tenant component of the hybrid software deployment.

To provide further context for implementations of the present disclosure, and as introduced above, software systems can be provisioned by software vendors to enable enterprises to conduct operations. Software systems can include various applications that provide functionality for execution of enterprise operations. In some instances, software vendors provide software systems as off-premise applications that are executed in cloud computing environments, which can be referred to as cloud-based applications (e.g., applications provided in a so-called Software-as-Service (SaaS) deployment). In some instances, software vendors provide software systems as on-premise applications that are executed locally by enterprises (e.g., applications provided in a so-called edge deployment). In some instances, software systems are provided in hybrid deployments that include edge (on-premise) deployment (e.g., satellite components deployed to a data center operated by an enterprise) and cloud deployment (e.g., central components provided as a cloud service by the software vendor).

A hybrid deployment (i.e., edge and cloud) is typically used, if certain components need to be close to the enterprise (e.g., in an enterprise facility close to or within machines in a factory) to, for example, minimize latency and data volume sent over a network. However, there are still some components executed as a cloud-based service (e.g., components related to processes spanning different on-premise deployments or integrated with other cloud-based processes). In the context of hybrid deployments, an example setup can include a combination of a tenant of a cloud-based (SaaS) product used in production, a tenant of the same cloud-based product used for testing, on-premise (edge) components deployed to several instances on customer premises (e.g., at a data center, at a factory), which are used in production, and, for each type of on-premise component, an instance is deployed on-premise to be used for testing. In this example setup, the production on-premise components are connected to the cloud tenant used for production, and the test on-premise component is connected to the cloud tenant used for testing.

Typically, cloud offerings (e.g., the production tenant and the test tenant in the example setup) are managed by the software vendor. Software version updates can be pushed by the software vendor at relatively high frequency (e.g., once a day). This means that software version changes are done on a schedule defined by the software vendor. On the other hand, the on-premise components are typically managed by the enterprise (customer). For example, software version change schedules are defined by the enterprise, typically at a lower frequency (e.g., weeks, months). This is particularly the case, if the software updates require downtime, or otherwise result in functional deprecation. Consequently, in hybrid deployments there is a combination of components, which are partly managed by the enterprise and partly by the software vendor at different frequencies.

In an ideal world, software changes are compatible across different versions, deployments do not require downtime, and deployments do not fail. Additionally, in the ideal world, administrative overhead is low. In reality, however, software changes can be accompanied with downtime. This is particularly the case in edge components, which are deployed on the edge due to low latency and high data volume connection from a remote location (e.g., factory). In such cases, an aspirational "zero downtime" might not be met (e.g., required fast response with high call rate increases the complexity to provide a "zero downtime" version change). A change in a component version must thus typically be coordinated with periods of lower use in the location or periods where delays cause a lower impact. Further, features in software introduced by a new software version requires testing and additional configuration before being switched (toggled) on (e.g., activated). Test and configuration thus need to be coordinated with feature-toggles in on-premise components and cloud tenants.

Accordingly, multiple technical issues arise in the context of hybrid deployments. An example issue includes a distributed toggle process, in which toggle-handling of features for edge deployments is not done centrally by the software vendor, but instead by enterprises (customers) at their own schedule. In further detail, feature-toggles are typically used to activate features in a controlled and risk-minimized manner, typically by the software vendor. In some examples, a feature can include functionality to be provided by the software. In some examples, a feature-toggle (also referred to as toggle herein) is computer-executable code (e.g., provided in the component) that can be executed to activate (switch on) a feature or deactivate (switch off) a feature.

The toggle process has clear advantages to minimize risk of change and reducing the cascading effects (e.g., blast radius) of an incompatible or defective change. When, in a software deployment, cloud and edge components are involved, the software vendor and the customer are involved in toggling. For example, the software vendor defines the toggle for a feature, the time-frame within which a toggle needs to be switched (e.g., a deadline, by which a feature must be activated) and the component versions required to use the toggled feature. However, the customer decides on an individual timing (e.g., potentially individually per edge instance over multiple edge instances at a customer) as to when a feature is activated. Still a software vendor will want to have the option to switch-off a feature (as with SaaS-only components), if the software vendor identifies problems with the software being rolled-out. This is challenging with a distributed deployment, schedule, and responsibilities. Typically, software vendors monitor problems with the newly toggled features in their monitoring data and in trouble tickets created by customers regarding the used product. This is challenging as well with a distributed deployment.

Another example technical issue is reflected in the relatively quick availability of new features in the cloud-based components with relatively slower availability of such features in edge components. For example, in cloud-based products, features are created and pushed relatively frequently, and the availability of each feature is controlled by a toggle, as introduced above. On edge components, the corresponding implementation of new features are only available after a software update, which, as also introduced above, is typically a customer-controlled process. This can lead to delays in availability of new features in edge components. Customers have timing constraints on upgrading edge software, which can further delay consumption. Consequently, there is a varying time delay between feature availability in different components, which needs to be managed, as there are dependencies in the integration processes between edge components and cloud components, so that features may only be activated once the corresponding software updates are applied both in the cloud and at the edge. There should be a process to support closing/managing the version gap and preventing customers from activating features unless all prerequisites are fulfilled. Depending on the feature, this may require some or all edge components to be on a compatible software version with the cloud deployment before a feature can be activated (e.g., either generally for the tenant or specifically for a subset of edge components that already fulfill the requirements).

Another example technical issue is the relatively fast removal of a feature-toggle (e.g., to clean-up the code base) once all customers have switched the toggle (i.e., activated the underlying feature). Developers create a feature-toggle to roll-out new development in a controlled manner. The feature-toggles allow for canary testing with fast switch-off in case of problems. However, the toggles clutter up the code base. At some point, developers want to remove the toggles from the code and generally activate the respective features. This should be disruption-free for customers. Consequently, toggles are only removed, once all customers have the toggle on (e.g., either switched on themselves, or switched on for all remaining customers). This could be done darkly without the need for a customer to act (e.g., no need to test, change configuration, etc.). In a cloud deployment, the toggle status in the tenants is known by the vendor, thus adoption trends are known, and development can be planned. For on-premise software, the toggle status is mostly unknown, such that adoption of a feature by customer on edge systems may be invisible to the vendor. If a toggle is removed, meaning that the switched code is now always executed (i.e., the feature is permanently activated), customers who rely on feature-off cannot be served any longer. Consequently, the usage of a feature needs to be known to the vendor to prevent them from breaking customer scenarios.

Another example technical issue is that customers want to enable new features in a controlled manner, including testing, at their own schedule. If a toggle is related to a functional change, the customer will certainly want to test the change within their own infrastructure before accepting the change. Even if a toggle does not impact functionality, maybe only performance, the customer will want to see the new software in their own infrastructure, especially if the software controls a critical process. Adopting new features is accompanied with risks and a customer will likely want to reduce the risk. For example, instead of switching on a new feature for all edge components (e.g., machines in a factory), start with one (less critical) and only move towards more mission critical components controlled by the edge software later (e.g., reduce the blast radius of the change). There can also be legal constraints, defining that a change needs to be tested and documented appropriately. Even in factories or with machines and processes that are continuously running (e.g., 24/7), there can be periods of lower use or times when it is easier to react to a change or problem (e.g. low usage during night, change experts are in the office during the day). Consequently, customers will want to plan the version switch at their own schedule (especially, if downtime is involved).

In view of the above context, implementations of the present disclosure provide a feature management system to provide consistent control of software feature rollouts and adoption management for software products deployed in hybrid deployments (i.e., cloud-based (SaaS) components and on-premise (edge) components). The feature management system of the present disclosure provides a feature management cockpit that includes a vendor view (vendor cockpit) and customer views (customer cockpits). The feature management cockpit enables definition of feature attributes and their dependencies to software versions, and provides processes for rollout, deployment, adoption, monitoring, and error handling in an orchestrated manner. With this, the co-operation between "SaaS operation teams" and "customer administrators" is tightened and processes spanning the lifecycle management across hybrid deployments with all their mutual dependencies are streamlined.

As described herein, the feature management system of the present disclosure embodies a beyond-cloud lifecycle management concept to address real-world situations beyond the theoretical ideal solutions, which assume unrealistic boundary conditions (e.g., always compatible interface evolution, immediate deployment of new software versions by customers). By embracing actual software development and customer adoption behavior, the feature management system of the present disclosure enables proactive management and automation of the required processes on both the software vendor side and the customer side to obviate complicated manual lifecycle management and reduce process runtimes and Total Cost of Operation (TCO) for hybrid software deployments.

Figure 1:
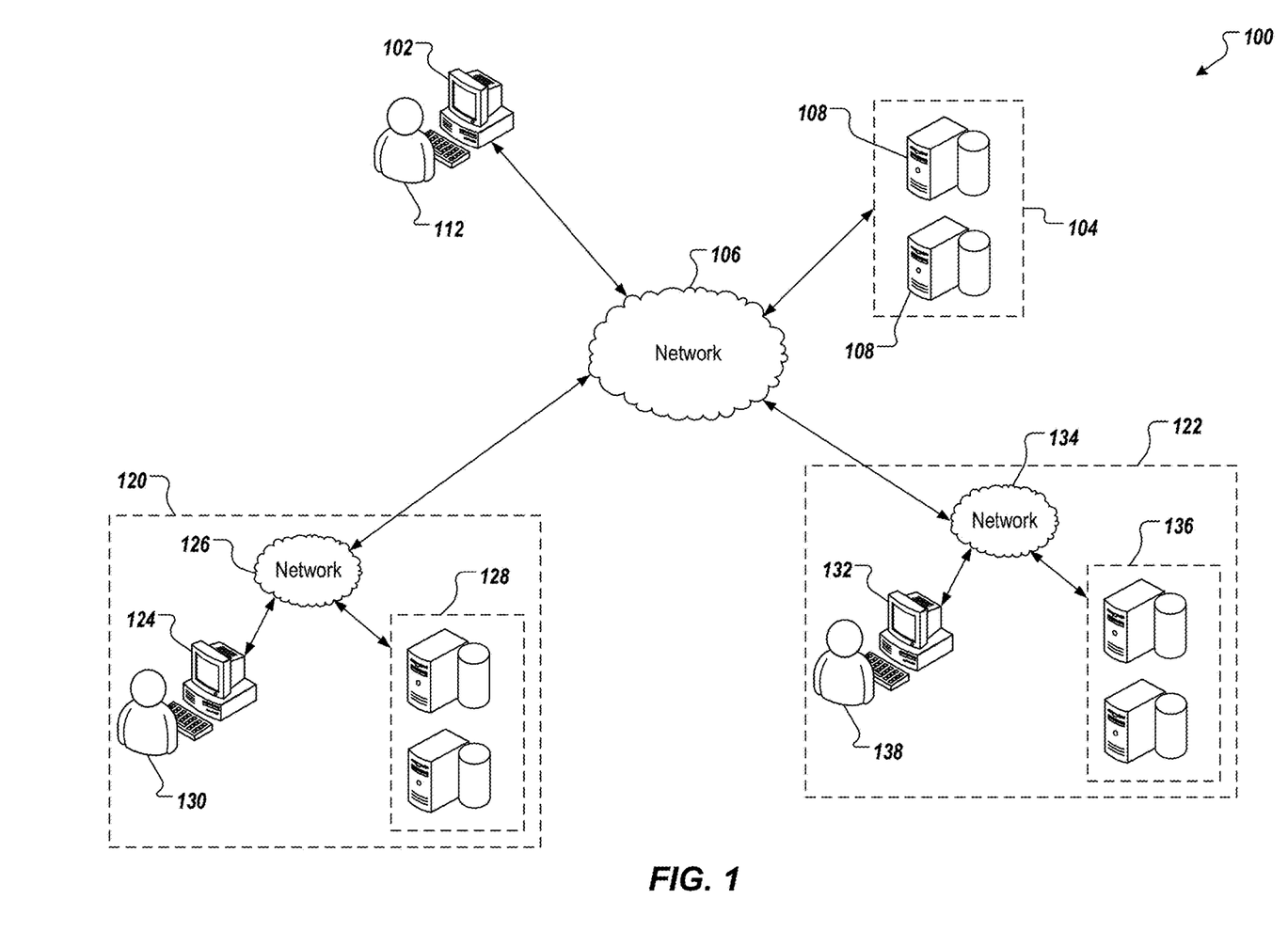
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102. In some examples, the server system 104 represents a vendor-side of a hybrid deployment scenario, in which one or more components of a software system are provided as cloud-based components hosted in the server system 104.

The example architecture 100 of FIG. 1 further includes a first customer system 120 and a second customer system 122. The first customer system 120 includes a client device 124, a network 126, and a server system 128. The server system 128 includes one or more server devices and databases (e.g., processors, memory). In the depicted example, a user 130 interacts with the client device 124. The second customer system 120 includes a client device 132, a network 134, and a server system 136. The server system 136 includes one or more server devices and databases (e.g., processors, memory). In the depicted example, a user 138 interacts with the client device 124. In some examples, the server systems 128, 136 represent respective customer-sides of a hybrid deployment scenario, in which one or more components of a software system are provided as on-premise (edge) components hosted in the server systems 128, 136. Although server systems 128, 136 are depicted in FIG. 1, it is contemplated that on-premise components can be implemented in any appropriate customer-side computing environment (e.g., computers, machines in a factory).

In some examples, the client devices 102, 124, 132 can communicate with the server system 104 over the network 106. In some examples, the client devices 124, 132 can communicate with the server systems 128, 136 over the networks 126, 134, respectively. In some examples, the client devices 102, 124, 132 include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or any appropriate combination of any two or more of these devices or other data processing devices. In some implementations, the networks 106, 126, 134 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, and as noted above, the server system 104 can host a feature management system. For example, the feature management system provides a feature management cockpit that includes a vendor view (vendor cockpit) and customer views (customer cockpits). For example, the user 112 (e.g., an employee/agent of a software vendor) can access a vendor cockpit using the computing device 102, the user 130 (e.g., an employee/agent of a customer) can access a customer cockpit using the computing device 124, and the user 138 (e.g., an employee/agent of a customer) can access a customer cockpit using the computing device 132.

As introduced above, the feature management system of the present disclosure provides a feature management cockpit, which supports feature rollouts and provides the benefits of feature-toggles to software deployed in cloud and on-premise (hybrid deployment). As described in further detail herein, the feature management system includes a dependency management component, a feature-problem analysis component, a software update scheduling and monitoring component, and a toggle activation component. In some examples, the dependency management component enables definition of dependencies between feature-toggles, software versions of edge components and cloud components, feature-toggle activation types, and feature-toggle deadlines. The dependency management component can also monitor software update and toggling status in customer cloud tenants and customer edge instances. In some examples, the feature-problem analysis component provides for analysis of ticketing data of customers and monitoring alerts of customer tenants and software instances, if dependent on a new software version and feature. This enables a software vendor to identify problems with a newly created feature and eventually pull-back an already published feature, if needed. In some examples, the software update scheduling and monitoring component enables a customer to plan and monitor updates of edge instances and toggle activation, depending on type of toggle-activation and toggle-deadline. Example types of toggle-activation can include, without limitation, edge instance (e.g., toggle-switch individually for each edge instance) and a tenant global (e.g., toggle-switch for all connected edge instances). The progress and status information are also accessible to the software vendor. In some examples, the toggle-activation component enables consistent switching toggle state across tenants and edge instances, if required by the toggle-activation type.

Figure 2:
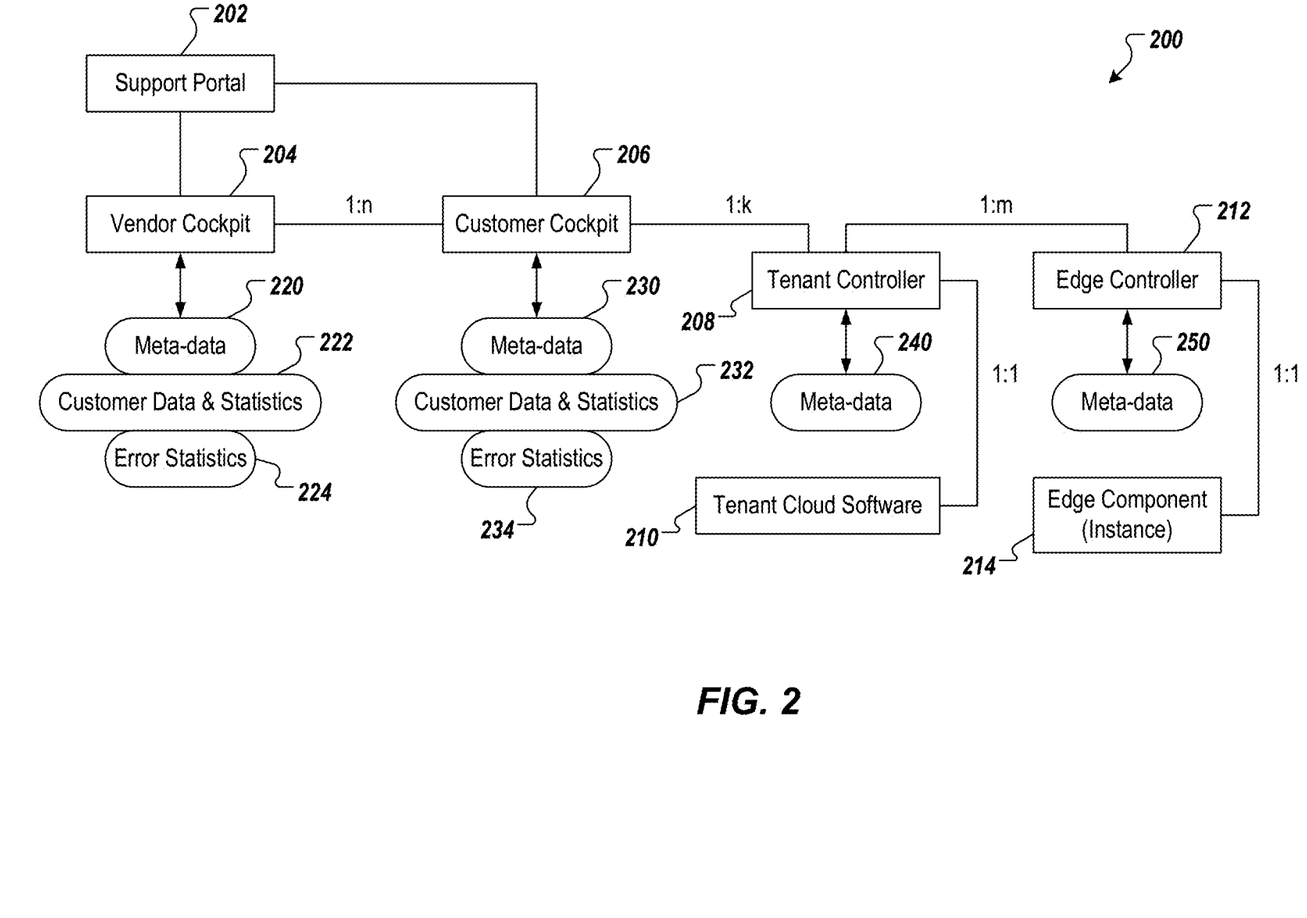
FIG. 2 depicts a conceptual overview of a feature management system in accordance with implementations of the present disclosure.

FIG. 2 depicts a conceptual overview of a feature management system 200 in accordance with implementations of the present disclosure. In the example of FIG. 2, the feature management system 200 includes a support portal 202, a vendor cockpit 204, and a customer cockpit 206. In the example of FIG. 2, a tenant controller 208 is provided for control (e.g., feature toggling) of tenant cloud software 210, and an edge controller 212 is provided for control (e.g., feature toggling) of an edge component 214. The tenant cloud software 210 represents a cloud component provisioned for a particular tenant (customer) within the cloud. The edge component 214 represents an instance of edge software provisioned on-premise at a customer location.

In some examples, the vendor cockpit 204 enables access to and interaction with meta-data 220, customer data and statistics 222, and error statistics 224. The meta-data 220 includes, for example, component information including all component versions (CVs), features (F) for each CV, deprecated features (Fa) for each CV, deadline per F (e.g., deadline to toggle on), and a flag per F indicating a status of the F (e.g., on-hold, activated). The customer data and statistics 222 include, for example, for each tenant (customer) in a set of tenants, CVs deployed to the tenant, Fs toggled in the tenant, and percentage of edges per tenant (including information if it is a "test" or "production" setup)

adopting each CV and each F. The error statistics 224 include, for example, links to incidents related to Fs for all customers.

In some examples, the customer cockpit 206 is customer-specific and enables access to and interaction with meta-data 230, customer data and statistics 232, and error statistics 234. The meta-data 230 includes, for example, component information including CVs relevant to the customer, Fs for each CV, and deadline per F (e.g., deadline to toggle on). The customer data and statistics 232 include, for example, for the tenant (customer) in the set of tenants, CVs deployed, Fs toggled, a schedule for deployment of version <n> to edge instances, and a list of edge instances, CVs, and toggled Fs. The error statistics 234 include, for example, a list of incidents related to Fs including links to support tickets.

In some examples, the tenant controller 208 accesses and interacts with meta-data 240. The meta-data 240 includes, for example, actually used CV in the tenant cloud software 210 (i.e., the current, active CV), available Fs, and toggle status per F. In some examples, the edge controller 210 accesses and interacts with meta-data 250. The meta-data 250 includes, for example, actually used CV in the edge component 214 (i.e., the current, active CV), available Fs, and toggle status per F.

Figure 3:
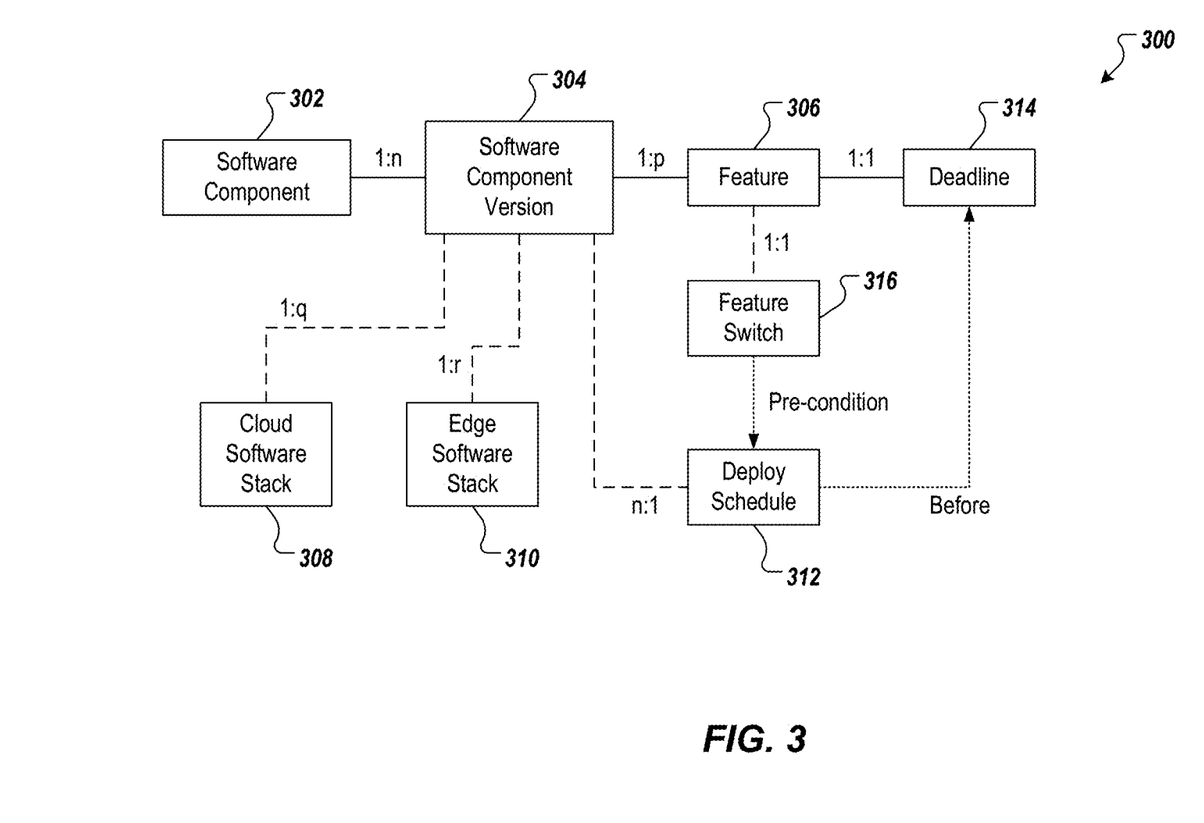
FIG. 3 depicts a conceptual overview of organization of meta-data.

FIG. 3 depicts a conceptual overview of an organization of meta-data 300.

The meta-data 300 includes data representative of a software component 302, one or more CVs 304 for each software component 302, and one or more Fs 306 for each CV 304. The meta-data 300 includes data representative of one or more cloud stacks 308 that a CV 304 is deployed to and one or more edge stacks 310 that a CV 304 is deployed to. In some examples, each CV 304 is associated with a deploy schedule 312 that defines deployment timing of a respective CV 304 to one of a cloud stack 308 and an edge stack 310. In some examples, the data includes data representative of a deadline 314, by which a respective feature switch (toggle) 316 is to be removed (e.g., a deadline, by which the feature is to be activated).

Referring again to FIG. 2, and in accordance with implementations of the present disclosure, the support portal 202 enables support personnel to access information representative of a hybrid software deployment. For example, the support personnel can use the support portal 202 to analyze trouble tickets related to different CVs. For example, if there is an error related to a feature that has been toggled, it can be determined whether there are more errors for other instances of the CV, which have also been toggled.

In some implementations, the vendor cockpit 204 is only accessible by the vendor and enables the vendor to define meta-data and control processes for feature management. In some implementations, the customer cockpit 206 is a dedicated instance for one customer, and through which the customer can the tenants and the edge instance landscape. In some examples, the vendor cockpit 204 communicates with each of multiple customer cockpits 206, a customer cockpit 206 being provided for each customer using the software. Communication between the vendor cockpit 204 and each customer cockpit 206 can be two-way communication. For example, the vendor cockpit 204 can push information to the customer cockpit 206, and the customer cockpit 206 can push information to the vendor cockpit 204. In some examples, an event bus can be used to communicate information between the vendor cockpit 204 and the customer cockpit 206. In some examples, the vendor cockpit 204 can periodically pull information from the customer cockpit 206.

In some implementations, the feature management system shows features and which software versions are required to toggle the feature on. The feature management system also shows the involved component instances on cloud and edge and their software version and feature toggle status. In some examples, the feature management system enables switching (toggling) features on and off (off typically in cases of emergency, if there is a problem upon switching on). In some examples, switching can be embedded in an automation process. The feature management system also has functionality to plan the deployment of new versions, feature adoption and related change process and scheduling, when an update is deployed and when a feature is to be toggled for a certain instance. The feature management system supports the specific processes for different feature types, so a feature of a particular type is adopted correctly.

In further detail, the vendor cockpit 204 can be used by a software vendor to publish component versions, features, and feature deadlines, and the information is communicated to each of the customer cockpits 206. The vendor cockpit 204 provides an overview of statistics of software version and feature adoption by customers. Once a software version is adopted and the deadline is passed, the version and toggle are removed from the publish-list. In some examples, the vendor cockpit 204 can receive information from the customer cockpit 206 on software version and feature adoption statistics, and accesses information about software version and toggle adoption across all consumers, including a comparison against the deadline, for example. In some examples, the vendor cockpit 204 accesses information about the toggle-schedule of the customers, to notify customers, in case a feature toggle is pulled-back.

In some implementations, the customer cockpit 206 provides features to display which component versions and related features are available, how the feature toggle needs to be executed, and what the deadline is for adoption of a feature. In some examples, the customer cockpit 206 can receive information from the vendor cockpit 204 about a postponed deadline, for example, and update the information for the adoption schedules. In some examples, the customer cockpit 206 provides a landscape overview representing which edge instances use a software component and which version is deployed. In some examples, the customer cockpit 206 provides a feature overview representing which edge instances has toggled which features on. In some examples, the customer cockpit 206 provides an overview with information on the feature-adoption-progress, deployment schedule, compared with the deadline, for example. In some examples, the customer cockpit 206 can push aggregated statistical information on software version and feature adoption to the vendor. In some examples, the customer cockpit 206 enables scheduling of software updates on the edge instances. In some examples, an edge-instance individual schedule for deployment can be provided. In some examples, the customer cockpit 206 enables toggling a feature on/off, the toggle process depending on the feature type.

In further detail, the vendor cockpit 204 enables dependency management of the features and the component versions that are in use in the hybrid deployment. This building block deals with the dependency definition, the process to define and roll-out the information and about collecting information from consumers on used versions. In some examples, the vendor cockpit 204 can be used to define dependency between component versions and the features in the software, which can be switched. For example, for cloud, component version—feature-toggle-availability, and, for edge, software version—feature-toggle-availability. In some examples, a deadline is defined, by which the feature needs to be adopted, because the feature-off state will be deprecated and later software versions will no longer contain the feature-toggle. That is, after the deadline, the feature is on by default.

By way of non-limiting example, a feature <f-1> is new and switchable once version <n1> is deployed on the edge, and feature <f-1> is no longer switchable once version <n2> is deployed to the cloud. Using the vendor cockpit 204, the following example information can be specified for an edge software version <n1>:

New feature is developed—related to a feature-toggle <ft-1> for the feature <f-1>.
Whether the switch can be set [a] individually per edge or [b] is to be set globally for the tenant.
A feature consumption deadline <d_1>.

Using the vendor cockpit 204, the following example information can be specified for a later edge software version <n2>:

The toggle <ft-1> is removed, the feature <f-1> is permanently switched to "on". The vendor cockpit 204 publishes the edge software version <n1>/<n2> on a related marketplace or download area for download and deployment, when the corresponding cloud versions <n1>/<n2> have been deployed to the cloud tenants used by the customer. In some examples, the vendor cockpit 204 announces the new software version and feature to the customer. For example, the vendor cockpit 204 sends a message to the customer cockpit 206, such that a customer (e.g., administrator) can see in the customer cockpit 206, the information about a feature, software version for deployment, and the defined deadline.

In some examples, to proceed with the feature development, the vendor would like to have a rule where the vendor only applies version <n2>, once all customers have deployed <n1> and toggled <ft-1> to on (i.e., activated the feature <f-1>). If some customers have not yet toggled <ft-1> by the time <n2> is to be deployed and consumed, the vendor can decide to postpone deployment of <n2> to the cloud or accept breaking customer processes based on <ft-1> being toggled-off. To avoid this situation, sufficient time between the deadline and deployment of <n2> is planned. In view of this, the vendor cockpit 204 provides monitoring information. Example monitoring information can include, without limitation, versions used by the customers on their edge instances (e.g., how many customers are on version <n1> and how many are on older versions), and the information on the feature toggle-status (e.g., how many customers, who have already deployed version <n1>, have already switched on feature <f-1> on how many instances are still running without the feature).

In accordance with implementations of the present disclosure, the feature management system provides for feature usage and problem analysis. For example, to determine whether a feature being rolled-out really works or whether roll-out should be stopped, multiple domains of information are required. For example, how is adoption running, how many people use the new feature (have toggled-on), how is the feature running, and are there problems observed or reported? On the problem side, alerts and trouble tickets are analyzed, to identify whether a toggled-on feature leads to increased alert rate and higher ticket volume, and whether there are alerts and tickets related to the toggled feature.

In view of this, the vendor cockpit 204 can access a vendor trouble ticketing system and/or a customer incidents management component, problem-, ticket-, and service requests. In some examples, the vendor cockpit 204 can be used to query the trouble ticketing system for tickets related to a component version and feature. In some examples, the vendor cockpit 204 can create statistics of tickets per CV and feature per day or week to enable analysis of trends, increased or decreased ticket numbers over time. In some examples, the vendor cockpit 204 accesses the vendor alerting system (or similarly, an event bus system), receiving events and alerts from SaaS tenants and instances connected to the SaaS tenants. In some examples, the vendor cockpit 204 can be used to query the alerting system or Event Bus Data Lake for alerts and events of type (e.g., Error) related to a component version and feature. In some examples, the vendor cockpit 204 can create statistics of alerts and errors per component version and feature per day or week to enable analysis of trends, increased or decreased alert and error numbers over time.

Accordingly, through the vendor cockpit 204, a vendor can analyze alerts, errors and tickets related to a new feature. If a trend shows that a new feature leads to an increasing number of problems, the vendor can decide to postpone adoption of the feature, pull the feature back, and replace it with a new version later. By monitoring of customer upgrade scheduling, the vendor can see whether customers have planned an upcoming feature activation, and in case the problem numbers increase dramatically, the vendor can inform the customers to postpone their adoption.

Accordingly, the vendor cockpit 204 has a user interface (UI) to modify a deadline for a feature and a workflow to pull-back a feature. In some examples, the vendor cockpit 204 has a UI to add information for a newly created software component version with a new feature toggle to be the corrected version of a pulled-back feature. In some examples, the vendor cockpit 204 provides an infrastructure to notify customers. In some examples, a feature that is to be pulled back is removed from the list of available features in the software component version.

Also, in the customer cockpit 206, the respective toggle for a pulled back feature cannot be switched on any longer (or the customer can overwrite the lock after a warning and acknowledging to know the risk). In some examples, the customer can be asked to switch the feature off where it is already toggled on (or the customer can ignore this advice and continue using the feature, if they do not encounter problems). In some examples, the vendor cockpit 204 provides a UI to add information for a newly created software component version with a new feature toggle to be the corrected version of a pulled-back feature. For example, the vendor creates a new version of the software with a corrected feature, and publishes the new feature version, and allows toggling-on, when the new software version is deployed. The information is pushed to the customer cockpits 206, so customers can adjust their consumption plans, as needed.

In accordance with implementations of the present disclosure, the feature management system provides for upgrade scheduling and monitoring to enable customers to more easily plan the adoption of newly announced features. In some examples, in the customer cockpits 206, an upgrade schedule for edge components can be created and the adoption of the features can be monitored. In some examples, the customer cockpit 206 aggregates statistical data and pushes it to the vendor cockpit 204, so the vendor can monitor adoption. With reference to the example above, using the customer cockpit 206, the customer can see announced software version <n1>, the related feature <f-1> and its adoption deadline <d_1>. The customer has the task to schedule the edge deployment(s) before the specified deadline. In some examples, the customer can schedule the update (and toggling) individually for each edge component, but all edge components must be toggled before the deadline. For some features, the feature is implicitly activated with the deployment of the version. This is only possible, if the feature is of type [a] individual toggle-switch per edge is possible. Otherwise, deployment to all edges must occur before the feature is toggled consistently on all edges together with the toggle in the cloud (type [b]).

Monitoring of deployment and toggle progress across all edge components is provided the customer cockpit 206. For the customer, this is intended to support their scheduling and to provide the customer with information about their progress before the deadline. In some examples, the customer cockpit 206 sends monitoring information to the vendor cockpit 204 with the information annotated with the customer-ID (i.e., unique identifier uniquely identifying the customer among multiple customers). The vendor can use this information across all customers to, for example, make sure version <n2> is not deployed to the cloud before all customers have switched on the feature <f-1>.

As noted above, customers will want to plan software upgrade of edge components in a risk and impact-minimized way. As every change comes with the risk of error situations, the customer will want to test the change, identify edge instances to start roll-out with the lowest risk (e.g., minimize the blast radius of the change). Additionally, different edge instances will typically have individual time periods where a change fits best. The deployment of the new software version is thus a process spread over a certain period of time. Depending on the feature's type ([a] or [b]), the actual feature-toggle can potentially also be spread over time (for [a]) or is coordinated over all edge instances, once the required software version is deployed.

In some implementations, the feature management system provides for consistent toggling. For example, when a new software version with new features is deployed, it can be important to control the toggle-on across edge instances and tenants. In view of this, the customer cockpit 206 enables management of feature toggling, where features can only be toggled, when specified toggle-pre-conditions are met. For example, for type [a], the edge component to be switched is at least on version <n1> for feature <f-1>, and for type [b], all edge components are at least on version <n1> for feature <f-1>. If the feature is implicitly activated upon deployment to the edge, the feature toggle in the cloud tenant for this edge instance is set automatically by the deployment tool, once the deployment to the edge is completed successfully (more precisely, once the edge software version is switched to the new version).

In some examples, the customer cockpit 206 provides a process to toggle a feature. For example, for type [a], the customer selects an edge instance to be toggled, and triggers the toggle-on process, and, for type [b], all edge instances are selected, and the toggle-on process is triggered. In some examples, the customer cockpit 206 notifies selected edge instance(s) about imminent toggle change for the feature <f-1>. The edge instance(s) finish currently running processes, switch the toggle to on, send toggle-switch confirmation, and wait before starting new processes until acknowledgement of switch-on is received. Once (all) confirmation(s) is/are received, the toggle on the cloud component (tenant) is switched (for the specific edge instance (feature type [a]) or for the whole tenant (feature type [b])).

An acknowledgement of toggle-switch is sent to all edge instance(s) and the edge instance(s) continue the processes with new feature setting.

In some examples, a grace period is provided. For example, if the vendor cockpit did not receive a confirmation of toggle-switch from all edge instance(s), a roll-back of toggle-switch can be sent to the edge-instance(s). In this case, the edge instances switch the toggle back to off and continue processing with toggle-off.

Figure 4:
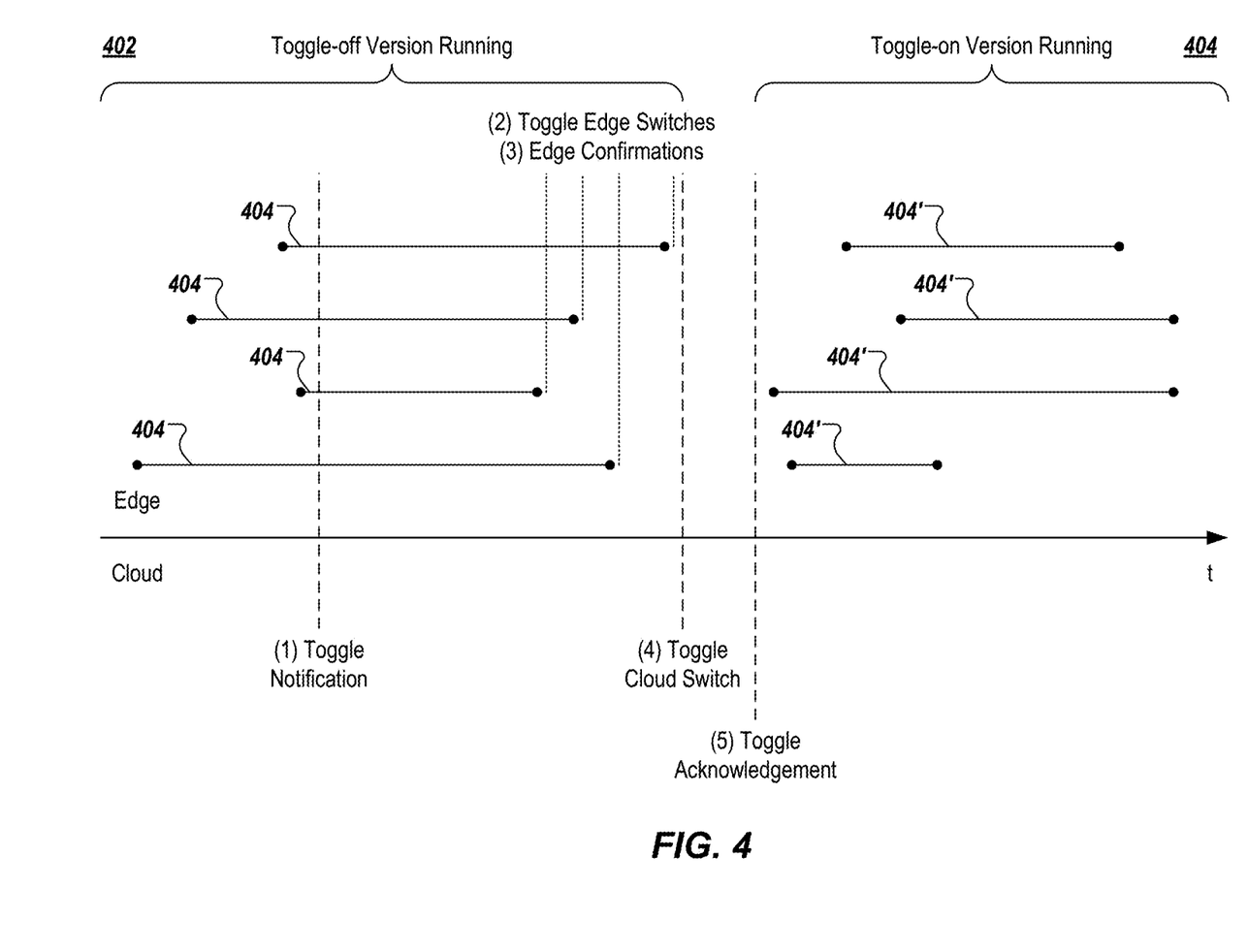
FIG. 4 depicts an example timeline representing toggling in accordance with implementations of the present disclosure.

FIG. 4 depicts an example timeline 400 representing toggling in accordance with implementations of the present disclosure. In the example of FIG. 4, a toggle-off period 402 and a toggle-on period 404 are depicted. In the toggle-off period, multiple processes 404 are being executed by respective edge components. While the processes 404 are executing, a toggle on notification is received (1). That is, each edge instance is notified that a feature is to be toggled on. When each process 404 completes, the feature is toggled on at the respective edge instances (2) and each edge instance sends a confirmation (3). In response to the confirmations received from the edge instances, the feature is toggled on for the corresponding cloud component (tenant) (4), and an acknowledgement is sent (5). Thereafter, processes 404' are executed by the edge instances in the toggle-on period 404.

To further illustrate implementations of the present disclosure, an example overall process is described in further detail herein. In this example, a vendor releases a new version <n> of a software product <s>, including a new feature which can be toggled by feature-toggle <ft>. The software version includes components for edge deployment <s_e> and cloud deployment <s_c>. Respective <ft_e> and <ft_c> toggles are provided for the deployments to enable fine-grained control of the change. The vendor push-deploys the software version <n> to the cloud instances <s_c>. The vendor enters the newly created software version <n> and the related software packages <s_e> and toggles <ft_e> and <ft_c>, for features <f_e> and <f_c>, respectively, in the vendor cockpit 204. The vendor publishes the software version <n> for customer consumption in the cloud and deployment on the edges using the vendor cockpit 204. The vendor cockpit 204 pushes information to the customer cockpit 206 about the toggles <ft_e> and <ft_c>, the version <n> of the edge software <s_e> to deploy and about the deadline for deployment <d_n> defined for this feature. In this example, the vendor plans to remove the toggles <ft_e> and <ft_c> with software version <n+x>, which is scheduled for deployment after <d_n>. Once the new version <n+x> is available, the vendor updates the information in the vendor cockpit 204, and the feature is removed from the list of features, which can be toggled.

A customer (of multiple customers) receives a notification of new feature and software version through the customer cockpit 206. Using the customer cockpit 206, the customer can determine which instances and tenants are impacted by the change. With this information, the customer can determine the related process(es) controlled by the impacted edge-instances, and can develop a plan for feature adoption, starting with a deployment to the test infrastructure, for example.

In a test phase, a cloud-test-tenant running <s_c> is already on version <n> and an edge-test-instance running <s_e> is updated to <n>. Feature <f_c> is toggled on in cloud-test-tenant and edge-test-instance <f_e> is toggled on through the customer cockpit 206. The new feature is tested. For example, test data can be processed using the feature and results can be generated. Impact to process(es) controlled by the edge instance(s) is evaluated. Example impacts can be in terms of downtime related to deployment and toggling the feature <f_e> on, and/or in terms of functional (e.g., changed APIs, changed configuration-values) and non-functional (e.g., performance) changes. As a result of the impact assessment, the deployment can be planned to the production landscape.

The customer defines a deployment and feature toggle schedule for production instances in the customer cockpit 206. In some examples, for feature toggles of type [a] (individually per edge), an edge instance is selected for initial deployment (e.g., pilot, first wave), which presumably has the lowest risk in applying the change. Depending on the size of the edge landscape, the rollout could be planned in several waves, each wave including a group of edge instances to minimize risk and enable incorporation of lessons learned from previous deployments for the next wave. A time-schedule for adoption of the feature in the different edge instances is created. The deployment and subsequent feature toggling can be automated in a process, which can be started for individual edge instances as soon as they have been updated to version <n>. In some examples, the customer may toggle the feature for individual edge components any time after they have been updated, but before deadline <d_n>.

In some examples, for features of type [b] (globally for the tenant), the deployment can be done in waves, as described above for type [a], depending on risk and best deployment window. The toggling of the features is to be scheduled for a suitable point in time with globally lowest risk for the involved edge instances, after all edge components have been updated to version <n>. The feature is toggled-on using the customer cockpit 206 in tenant and edges. In some examples, the phased roll-out of the feature <f> includes a first wave at a scheduled time, and during which, the edge instances that are part of the first wave are updated to <s_e> version <n> (and for type [a] the toggle is switched <ft_e>). Deployment execution and impact on connected process(es) are assessed, and scheduling can be adjusted as needed. If there is an issue, preventing the continued roll-out, the roll-out is stopped and the vendor is informed. Otherwise, a second wave is executed at a scheduled time, during which the edge instances that are part of the second wave are updated to <s_e> version <n> (and for type [a] the toggle is switched <ft_e>). Assessment is again performed. This process can continue until a final wave is deployed (e.g., the second wave can be the final wave).

For features of type [b], the toggle is switched on using the customer cockpit 206, which pushes information to the vendor cockpit, that the customer has fully adopted the version <n> and the feature <f>. The vendor can interact with the customer during adoption through the vendor cockpit 204 and the customer cockpit 206. For example, the vendor can be informed about a problem with adoption. In some examples, the notification results from the customer indicating that update/toggling feature <f> on resulted in a problem (e.g., by creating a trouble ticket in the vendor ticketing system). The vendor cockpit 204 periodically analyses tickets and customer alerts. In some examples, the vendor analyzes the issue and develops a solution to any problem(s).

In some examples, if a solution can be implemented by the customer, the customer adjusts the automation scripts, runs test and plans next waves of deployment. Typically, the vendor support provides the information through the incident ticket that the customer created. In some examples, if the solution is on the vendor side, the deadline <d_n> is extended or coupled to a new deadline <d_n_i>. A new version of the feature <f_new> is created with version <n+i> and a new feature-toggle <ft_i> is provided with a new deadline <d_n_i>, the process starts over from the beginning. This process is controlled through the vendor cockpit 204, at least in part, by the vendor cockpit 204 pushing information to the customer cockpit 206 to enable the customer to adjust the schedule. Customers having adopted the feature <f> without problem can continue using the feature Customers not having adopted the feature <f> can postpone adoption and replace their plans by new plans for <ft_i>, the deadline is now <d_n_i>.

As introduced above, the vendor monitors the adoption of provided features by customers through the vendor cockpit 204. If a customer does not run adoption and the deadline is coming closer, the vendor notifies customer of upcoming deadline and feature-toggle-deprecation. If some customers were unable to apply the requested version and this version is a prerequisite for deployment of further cloud versions (e.g., because the feature switch is removed as of a specific version), the cloud solution upgrade schedule may be paused until all customers are on the required version and have activated the feature.

Figure 5:
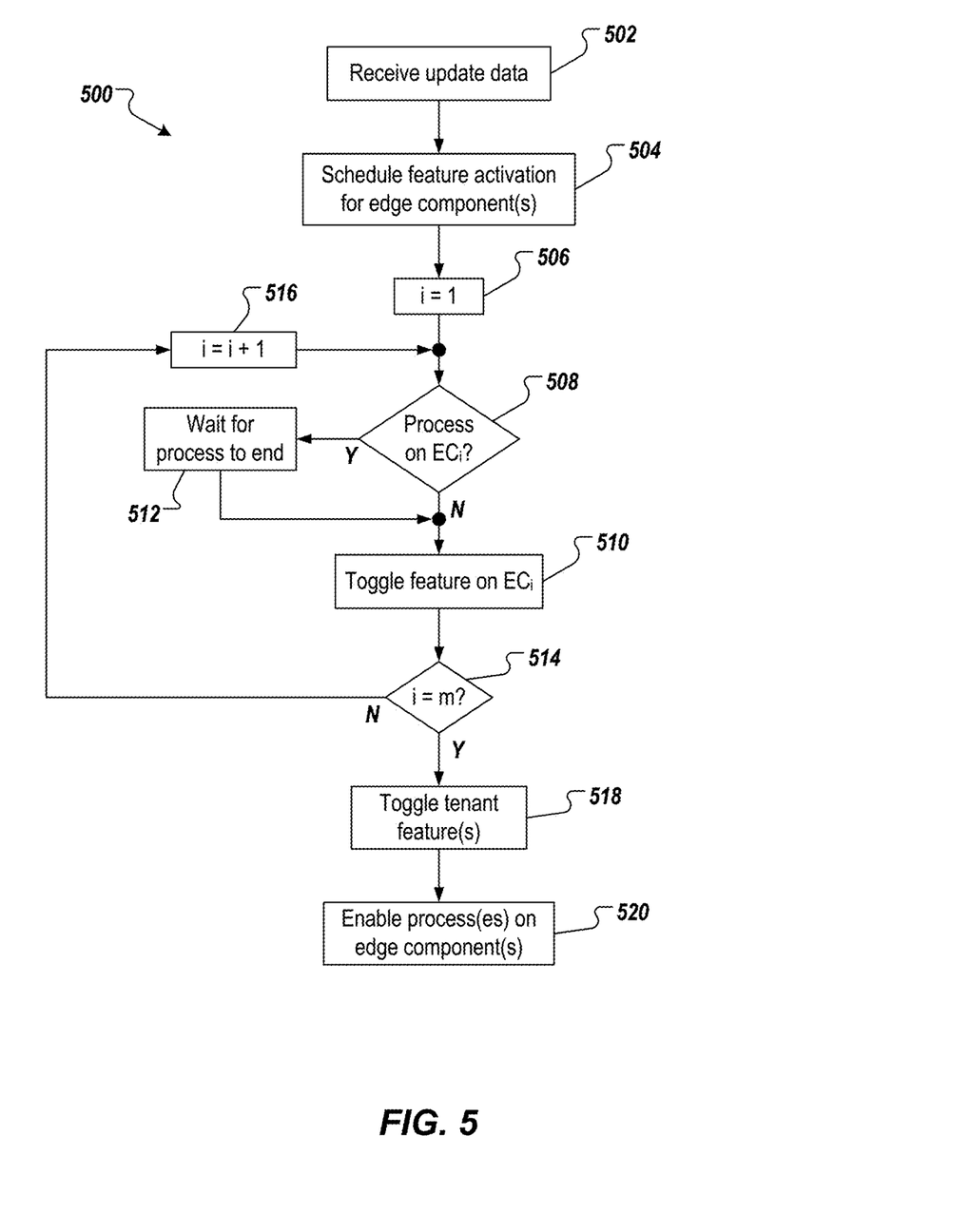
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Update data is received (502). For example, and as described herein, the vendor cockpit is used to publish data representative of an update to the hybrid software deployment. In some examples, the data includes a component version of edge components, one or more edge features, and a feature deadline for each of the edge features, the feature deadline indicating a deadline, by which, each edge feature is to be activated. Each of a plurality of customer cockpits receives the data representative of the update to the hybrid software deployment. Feature activation for one or more edge components is scheduled (504). For example, and as described herein, each customer can determine an appropriate time for activating edge features for edge components (edge component instances) in view of the deadline(s). A counter i is set equal to 1 (506). It is determined whether a process is executing on edge component i ($EC_i$) (508). If a process is not executing on $EC_i$, one or more features are toggled to an activated state in $EC_i$ (510). If a process is executing on $EC_i$, it was waited for the process to end (512), then one or more features are toggled to an activated state in $EC_i$ (510). For example, and as described herein, a feature-toggle for each feature is triggered to transition a respective edge feature from an inactive state to an activated state. It is determined whether i is equal to m (514). That is, it is determined whether all edge components of a respective customer have been addressed. If i is not equal to m, i is incremented (516) and the example process 500 loops back. If i is equal to m, one or more tenant features are toggled to the activated state (518). For example, and as described herein, a feature-toggle for each tenant feature is triggered to transition a respective tenant feature from an inactive state to an activated state. The edge components are enabled to execute one or more processes (520).

Figure 6:
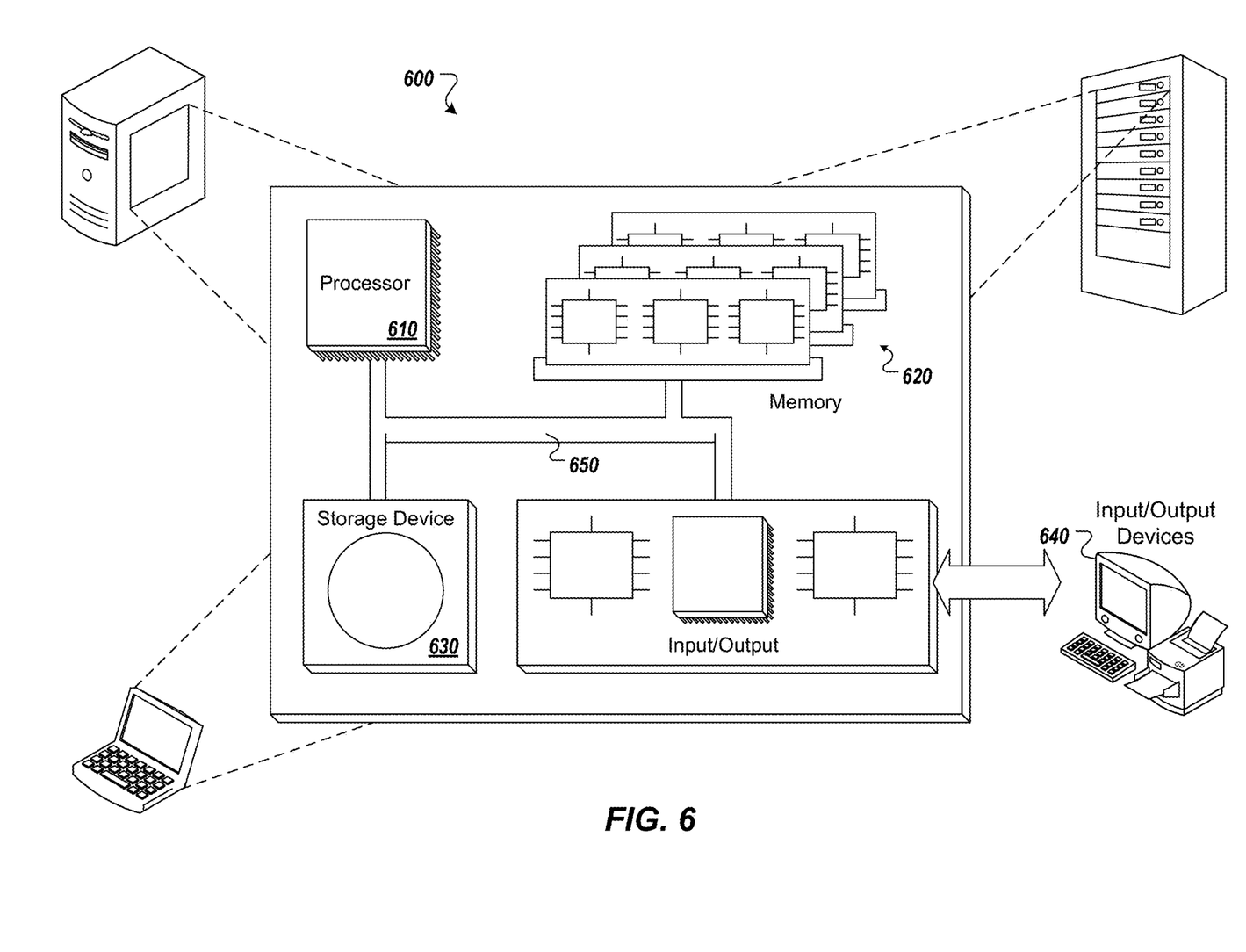
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing features in hybrid software deployments, the method being executed by one or more processors and comprising:
   receiving, by a customer cockpit, a toggle notification indicating that an edge feature of an edge component of a hybrid software deployment is to be activated, the toggle notification being received during execution of a process by the edge component;
   determining, by the customer cockpit, that the process has ended and, in response, triggering an edge controller to toggle the edge feature to an activated state within the edge component;
   receiving, by a vendor cockpit, an edge confirmation of the edge component that confirms that the edge feature is in the activated state; and
   at least partially in response to receiving the edge confirmation, triggering, by the vendor cockpit, a tenant controller to toggle a tenant feature to an activated state within a tenant component of the hybrid software deployment.

2. The method of claim 1, further comprising:
   receiving, by the customer cockpit, a tenant confirmation of the tenant component that confirms that the tenant feature is in the activated state; and at least partially in response to receiving the tenant confirmation, enabling a process to be executed by the edge component at least partially using the edge feature.

3. The method of claim 1, further comprising removing a feature-toggle corresponding to the edge feature from the edge component after the edge feature is in the activated state, the feature-toggle comprising computer-executable code that is executed to transition the edge feature to the activated state.

4. The method of claim 1, further comprising removing a feature-toggle corresponding to the tenant feature from the tenant component after the tenant feature is in the activated state, the feature-toggle comprising computer-executable code that is executed to transition the tenant feature to the activated state.

5. The method of claim 1, wherein the edge controller is triggered to toggle the edge feature to the activated state prior to expiration of a deadline.

6. The method of claim 1, further comprising determining that a problem has occurred after toggling the edge component to the activated state, and, in response, toggling the feature to an inactive state.

7. The method of claim 1, further comprising:
  publishing, by the vendor cockpit, data representative of an update to the hybrid software deployment, the data comprising a component version of the edge component, the edge feature, and a feature deadline for the edge feature, the feature deadline indicating a deadline, by which, the edge feature is to be activated; and
  receiving, by each of a plurality of customer cockpits including the customer cockpit, the data representative of the update to the hybrid software deployment.

8. A non-transitory computer-readable storage medium coupled to one or more processors and having instructions stored thereon which, when executed by the one or more processors, cause the one or more processors to perform operations for managing features in hybrid software deployments, the operations comprising:
  receiving, by a customer cockpit, a toggle notification indicating that an edge feature of an edge component of a hybrid software deployment is to be activated, the toggle notification being received during execution of a process by the edge component;
  determining, by the customer cockpit, that the process has ended and, in response, triggering an edge controller to toggle the edge feature to an activated state within the edge component;
  receiving, by a vendor cockpit, an edge confirmation of the edge component that confirms that the edge feature is in the activated state; and
  at least partially in response to receiving the edge confirmation, triggering, by the vendor cockpit, a tenant controller to toggle a tenant feature to an activated state within a tenant component of the hybrid software deployment.

9. The non-transitory computer-readable storage medium of claim 8, wherein operations further comprise:
  receiving, by the customer cockpit, a tenant confirmation of the tenant component that confirms that the tenant feature is in the activated state; and
  at least partially in response to receiving the tenant confirmation, enabling a process to be executed by the edge component at least partially using the edge feature.

10. The non-transitory computer-readable storage medium of claim 8, wherein operations further comprise removing a feature-toggle corresponding to the edge feature from the edge component after the edge feature is in the activated state, the feature-toggle comprising computer-executable code that is executed to transition the edge feature to the activated state.

11. The non-transitory computer-readable storage medium of claim 8, wherein operations further comprise removing a feature-toggle corresponding to the tenant feature from the tenant component after the tenant feature is in the activated state, the feature-toggle comprising computer-executable code that is executed to transition the tenant feature to the activated state.

12. The non-transitory computer-readable storage medium of claim 8, wherein the edge controller is triggered to toggle the edge feature to the activated state prior to expiration of a deadline.

13. The non-transitory computer-readable storage medium of claim 8, wherein operations further comprise determining that a problem has occurred after toggling the edge component to the activated state, and, in response, toggling the feature to an inactive state.

14. The non-transitory computer-readable storage medium of claim 8, wherein operations further comprise:
  publishing, by the vendor cockpit, data representative of an update to the hybrid software deployment, the data comprising a component version of the edge component, the edge feature, and a feature deadline for the edge feature, the feature deadline indicating a deadline, by which, the edge feature is to be activated; and
  receiving, by each of a plurality of customer cockpits including the customer cockpit, the data representative of the update to the hybrid software deployment.

15. A system, comprising:
  a computing device; and
  a computer-readable storage device coupled to the computing device and having instructions stored thereon which, when executed by the computing device, cause the computing device to perform operations for managing features in hybrid software deployments, the operations comprising:
    receiving, by a customer cockpit, a toggle notification indicating that an edge feature of an edge component of a hybrid software deployment is to be activated, the toggle notification being received during execution of a process by the edge component;
    determining, by the customer cockpit, that the process has ended and, in response, triggering an edge controller to toggle the edge feature to an activated state within the edge component;
    receiving, by a vendor cockpit, an edge confirmation of the edge component that confirms that the edge feature is in the activated state; and
    at least partially in response to receiving the edge confirmation, triggering, by the vendor cockpit, a tenant controller to toggle a tenant feature to an activated state within a tenant component of the hybrid software deployment.

16. The system of claim 15, wherein operations further comprise:
  receiving, by the customer cockpit, a tenant confirmation of the tenant component that confirms that the tenant feature is in the activated state; and
  at least partially in response to receiving the tenant confirmation, enabling a process to be executed by the edge component at least partially using the edge feature.

17. The system of claim 15, wherein operations further comprise removing a feature-toggle corresponding to the edge feature from the edge component after the edge feature is in the activated state, the feature-toggle comprising computer-executable code that is executed to transition the edge feature to the activated state.

18. The system of claim 15, wherein operations further comprise removing a feature-toggle corresponding to the tenant feature from the tenant component after the tenant feature is in the activated state, the feature-toggle comprising computer-executable code that is executed to transition the tenant feature to the activated state.

19. The system of claim 15, wherein the edge controller is triggered to toggle the edge feature to the activated state prior to expiration of a deadline.

20. The system of claim 15, wherein operations further comprise determining that a problem has occurred after toggling the edge component to the activated state, and, in response, toggling the feature to an inactive state.

* * * * *